United States Patent
Tao

(10) Patent No.: US 12,478,762 B1
(45) Date of Patent: Nov. 25, 2025

(54) BREATHING ADJUSTMENT APPARATUS

(71) Applicant: Dongguan Qinshi Jewelry Co., Ltd., Guangdong (CN)

(72) Inventor: Wei Tao, Hunan (CN)

(73) Assignee: Dongguan Qinshi Jewelry Co., Ltd., Guangdong (CN)

( * ) Notice: Subject to any disclaimer, the term of this patent is extended or adjusted under 35 U.S.C. 154(b) by 0 days.

(21) Appl. No.: 19/213,165

(22) Filed: May 20, 2025

(30) Foreign Application Priority Data

Apr. 17, 2025 (CN) .......................... 202520735020.7

(51) Int. Cl.
- A61M 21/02 (2006.01)
- A61M 21/00 (2006.01)
- A63B 21/00 (2006.01)
- A63B 23/18 (2006.01)

(52) U.S. Cl.
CPC ....... *A61M 21/02* (2013.01); *A63B 21/00185* (2013.01); *A63B 23/18* (2013.01); *A61M 2021/0016* (2013.01); *A61M 2021/0088* (2013.01); *A61M 2205/7536* (2013.01); *A63B 2213/005* (2013.01)

(58) Field of Classification Search
CPC .......... A61M 21/02; A61M 2021/0016; A61M 2021/0088; A61M 2205/7536; A63B 21/00185; A63B 23/18; A63B 2213/005
USPC ..................................................... 600/26–28
See application file for complete search history.

(56) References Cited

U.S. PATENT DOCUMENTS

| | | | |
|---|---|---|---|
| 4,444,202 A * | 4/1984 | Rubin | A61B 5/0875 482/13 |
| 4,973,047 A * | 11/1990 | Norell | A63B 23/18 482/13 |
| 6,083,141 A * | 7/2000 | Hougen | A61M 16/0006 128/202.16 |
| 6,702,769 B1 * | 3/2004 | Fowler-Hawkins | A61M 16/08 482/13 |
| 11,433,195 B2 | 9/2022 | Steinberg | |
| 2007/0089740 A1 * | 4/2007 | Baumert | A61M 16/0488 128/200.24 |
| 2008/0009222 A1 * | 1/2008 | Lombardi | A01M 31/004 446/207 |
| 2008/0041375 A1 * | 2/2008 | Stratton | A62B 7/00 128/203.23 |
| 2008/0053456 A1 * | 3/2008 | Brown | A61M 16/20 600/529 |
| 2008/0110451 A1 * | 5/2008 | Dunsmore | F01C 1/123 128/205.24 |
| 2009/0264256 A1 * | 10/2009 | Boerst | A63B 23/18 482/13 |
| 2015/0360079 A1 * | 12/2015 | Keller | A61M 16/0006 482/13 |

(Continued)

*Primary Examiner* — Sunita Reddy
(74) *Attorney, Agent, or Firm* — Ricky Lam

(57) ABSTRACT

Disclosed is a breathing adjustment apparatus, comprising: a body provided with a breathing channel, the body being of a hollow tubular structure; a first opening disposed at one end of the body and configured to be inserted into the mouth of a user; a second opening in communication with the first opening, wherein the second opening is disposed at the other end of the body and configured for exhalation; and an inner core housed within the body for providing a breathing resistance; wherein air enters the body through the first opening and reaches the second opening through the inner core.

8 Claims, 4 Drawing Sheets

(56) References Cited

U.S. PATENT DOCUMENTS

| | | | |
|---|---|---|---|
| 2016/0174540 A1* | 6/2016 | Werth | A01M 31/004 |
| | | | 446/207 |
| 2018/0056017 A1* | 3/2018 | Steinberg | A61M 16/0866 |
| 2021/0020061 A1* | 1/2021 | Weinstein | G09B 23/00 |
| 2021/0178094 A1* | 6/2021 | Soma | A63B 23/18 |
| 2021/0379327 A1* | 12/2021 | Berg | G10K 5/00 |
| 2023/0233099 A1* | 7/2023 | Mather | A61B 5/087 |
| | | | 600/529 |
| 2023/0405401 A1* | 12/2023 | Hu | A63B 23/18 |
| 2024/0066354 A1* | 2/2024 | Lee | A61B 5/097 |
| 2024/0082634 A1* | 3/2024 | Wagner | A63B 23/18 |
| 2025/0058172 A1* | 2/2025 | Carbone | A63B 21/0085 |

* cited by examiner

BREATHING ADJUSTMENT APPARATUS

FIELD

The present disclosure relates to the field of breathing adjustment, and more particularly to a breathing adjustment apparatus.

BACKGROUND

As we are becoming more and more dependent on electronic devices, the prevalence of digital technology has perpetuated stress and anxiety among us. Anxiety disorder is one of the outcomes of stress and seriously affects our health. Smoking has a stress-relieving effect on many people, and those who are addicted to cigarettes usually enjoy a breathing adjustment effect brought by nicotine and the smoke itself. For example, the structure of a cigarette includes tobacco leaves and a filter element. While addicted users smoke, the suction resistance brought by the tobacco leaves and the filter element gives them a sense of stress relief. However, it is well known that smoking is harmful to health while reducing stress.

One solution to help cope with increasing stress is to adjust our breathing. When we feel stressed, our breathing usually becomes shallow or held, which may increase heart rate and/or blood pressure. Breathing is key to physical and mental health, boosting energy and relieving pain. The problem is that most people are not aware of how breathing affects their mental state, nor do they know how long to inhale or exhale in order to reap the true benefits of deep breathing. There is therefore an urgent need for a breathing adjustment apparatus that can mimic the process of smoking but is not harmful to the body, which apparatus is portable and compact while having a breathing adjustment effect.

SUMMARY

The technical problem addressed by the present disclosure is to slow down the breathing rhythm by exhaling through a tube body so that the user experiences a physiological and neurological transition to calmness and stillness.

In view of the foregoing and some other ideas the present disclosure is proposed.

According to one aspect of the present disclosure, a breathing adjustment apparatus is provided, comprising:
- a body provided with a breathing channel, the body being of a hollow tubular structure;
- a first opening disposed at one end of the body and configured to be inserted into the mouth of a user;
- a second opening in communication with the first opening, wherein the second opening is disposed at the other end of the body and configured for exhalation; and
- an inner core housed within the body for providing a breathing resistance;
- wherein air enters the body through the first opening and reaches the second opening through the inner core.

In one embodiment, the body comprises a first body and a second body connected to the first body, and the first body is rotatable clockwise or counterclockwise relative to the second body.

In one embodiment, the first body comprises a first connecting portion, and a first accommodating cavity extending toward the second opening and configured to accommodate the inner core.

In one embodiment, the first accommodating cavity comprises a third opening.

In one embodiment, the second body comprises a second connecting portion, the first connecting portion is connected to the second connecting portion, and the first connecting portion is rotatable clockwise or counterclockwise relative to the second connecting portion.

In one embodiment, the first connecting portion comprises a first limiting structure and a second limiting structure, which are configured to restrict the second body to a first position and a second position on the first body.

In one embodiment, the first limiting structure and the second limiting structure are disposed on the outer edge of the first connecting portion and protrude outward, respectively.

In one embodiment, the breathing adjustment apparatus further comprises a suspension unit, which is provided with a third connecting portion connected to the first connecting portion.

In one embodiment, the inner core contains an aromatherapy material.

In one embodiment, the first body comprises a first breathing channel, the second body comprises a second breathing channel, and the first breathing channel and the second breathing channel constitute the breathing channel.

In one embodiment, a first boss is disposed at one end of the first accommodating cavity in proximity to the second opening.

In one embodiment, the second opening is matched with the first boss such that the first boss may be inserted into and block the second opening.

In one embodiment, when the second body is at the first position, the first boss is inserted into the second opening, and the first body is not rotatable clockwise or counterclockwise relative to the second body, such that the first breathing channel and the second breathing channel are not in communication with the external environment; and when the second body is at the second position, the first boss is separated from the second opening, and the first body is rotatable clockwise or counterclockwise relative to the second body, such that the first breathing channel and the second breathing channel are in communication with the external environment.

In one embodiment, when the first boss is separated from the second opening and the first body is rotatable clockwise or counterclockwise relative to the second body, the user can rotate the second body to misalign the first boss and the first opening.

In one embodiment, the inner core comprises cotton.

In one embodiment, the diameter of the inner core differs from the inner diameter of the first accommodating cavity by −2 to 2 mm.

In one embodiment, the first body comprises a tip configured to be inserted into the mouth of a user.

In one embodiment, when the first body is connected to the second body, the suspension unit is located between the first body and the second body.

In one embodiment, the second body is a cylindrical structure with a circular cross-section and a constant inner diameter.

In one embodiment, the body has a length of 5-8 cm.

The breathing adjustment apparatus provided by the present disclosure slows down the breathing rhythm by exhaling through the tubular body, enabling the user to experience a physiological and neurological transition to calmness and stillness. The guided breathing technique through this apparatus may serve as a preventive measure, allowing the user to start the day with a sense of calm or helping to quell anxious thoughts.

More embodiments of the present disclosure may also achieve other beneficial technical effects not exhaustively listed herein, and these other technical effects may be partially described below and be predictable and understandable to those skilled in the art upon reading the present disclosure.

BRIEF DESCRIPTION OF THE DRAWINGS

To illustrate the technical solutions in the embodiments of the present disclosure more clearly, the following briefly introduces the accompanying drawings to be used in the description of the embodiments or the prior art. Obviously, the drawings described below show only some embodiments of the present disclosure. For those of ordinary skill in the art, other drawings may be derived from these accompanying drawings without exercising any ingenuity.

DETAILED DESCRIPTION

Figure 1:
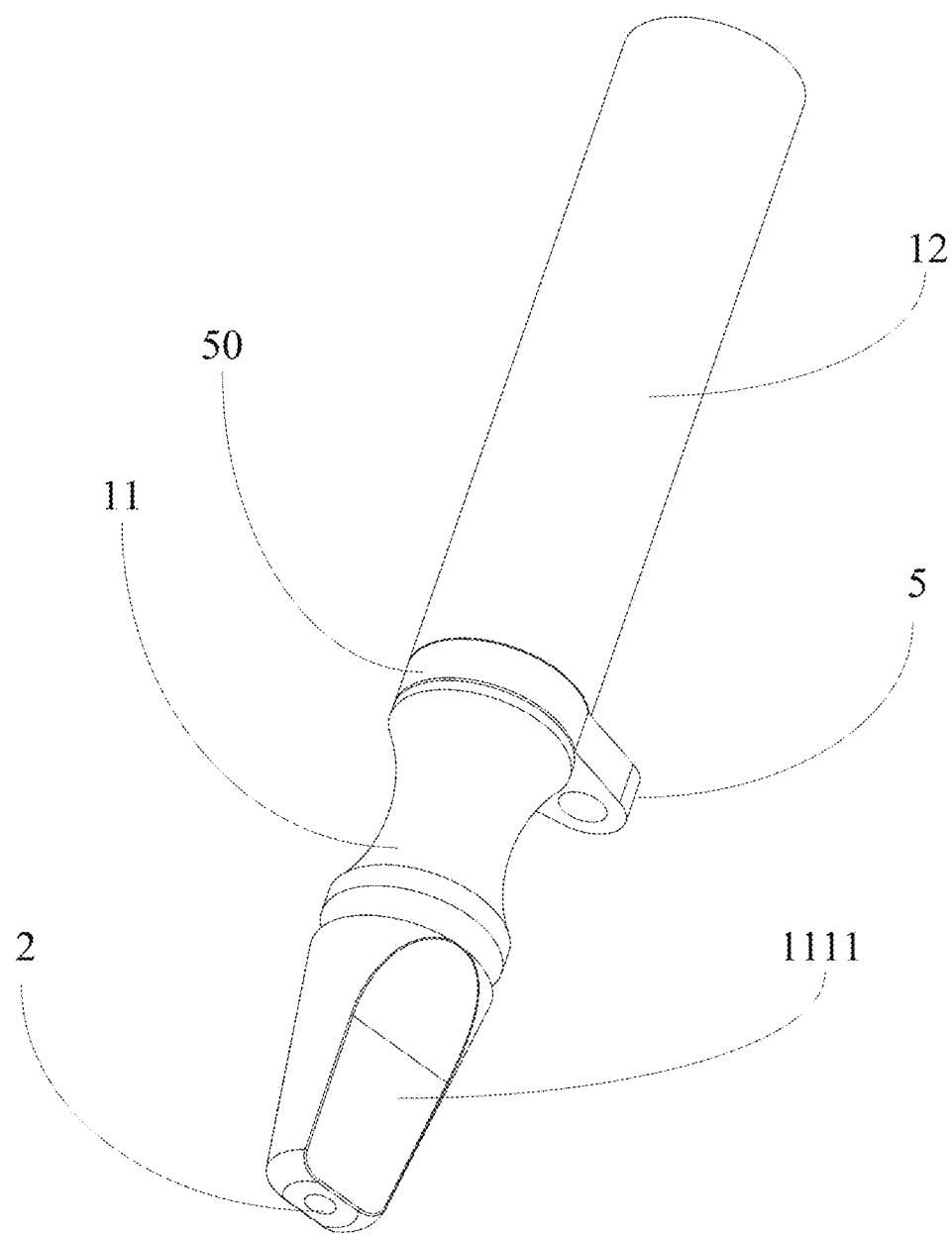
FIG. 1 is a three-dimensional view of the breathing adjustment apparatus of the present disclosure.

To make the objects, technical solutions, and advantages of the embodiments of the present disclosure more apparent, the technical solutions in the embodiments of the present disclosure will be set forth clearly and completely below in conjunction with the accompanying drawings. Obviously, the embodiments described herein are only a part of the embodiments of the present disclosure, rather than all of them. Generally, the components in the embodiments of the present disclosure that are described herein and illustrated in the drawings may be arranged or designed in a variety of different configurations.

Therefore, the detailed description of the embodiments illustrated in the drawings is not intended to limit the scope of the present disclosure, but merely to represent selected embodiments of the present disclosure. Based on the embodiments of the present disclosure, all other embodiments obtained by those skilled in the art without creative efforts also fall within the scope of the present disclosure.

It should be noted that like reference numerals and letters are used to denote like elements in the drawings. Therefore, once an item is defined in one figure, further definitions and explanations are not necessary in the subsequent figures.

In the description of the present disclosure, it should be noted that terms such as "upper", "lower", "left", "right", "vertical", "horizontal", "inner", "outer", and the like indicate positional or spatial relationships based on the orientations shown in the drawings or the conventional placement of the claimed product during use. These terms are used merely for the ease of description, rather than indicating or implying that the referenced device or element must have a particular orientation or be constructed and operated in a particular orientation, and thus should not be construed as limiting the present disclosure. Furthermore, terms such as "first", "second", and "third" are used solely for distinguishing elements and should not be construed as indicating relative importance. Unless otherwise specified, "a plurality of" used herein means two or more.

In addition, unless otherwise clearly defined, the terms "disposed", "connected", or the like should be understood in a broad sense, and may include fixed connection, detachable connection, integral connection, mechanical connection, electrical connection, or communicative connection, as appropriate. The specific meanings of these terms will be readily understood by those skilled in the art based on the particular context in which they are used.

In the present disclosure, unless otherwise explicitly specified, when a feature is stated to be "above" or "below" another feature, it may refer to direct contact or indirect contact through intervening elements. "Above", "over" and "on top of" may refer to directly above, obliquely above, or simply at a higher horizontal level, and "below", "under" and "beneath" may refer to directly below, obliquely below, or simply at a lower horizontal level.

The embodiments of the present disclosure will be described in detail below with reference to the accompanying drawings, in which same or similar reference numerals indicate same or similar elements, or elements having same or similar functions. The embodiments described with reference to the drawings are provided for illustrative purposes only and are not intended to limit the scope of the present disclosure.

FIG. 1 provides a breathing adjustment apparatus that adjusts the breathing of a user by providing resistance through an inner core.

Figure 2:
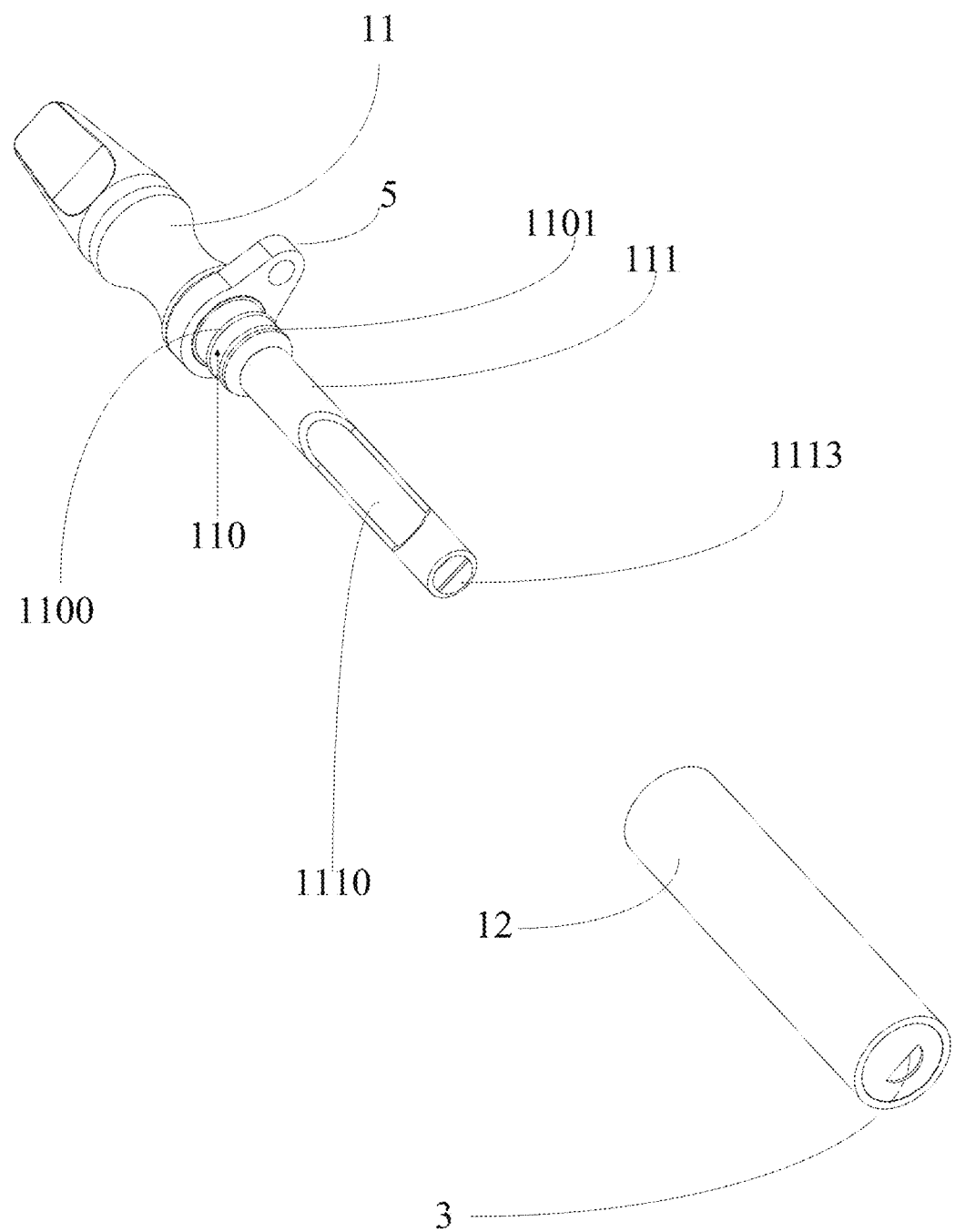
FIG. 2 is an exploded view of the breathing adjustment apparatus of the present disclosure.
Figure 3:
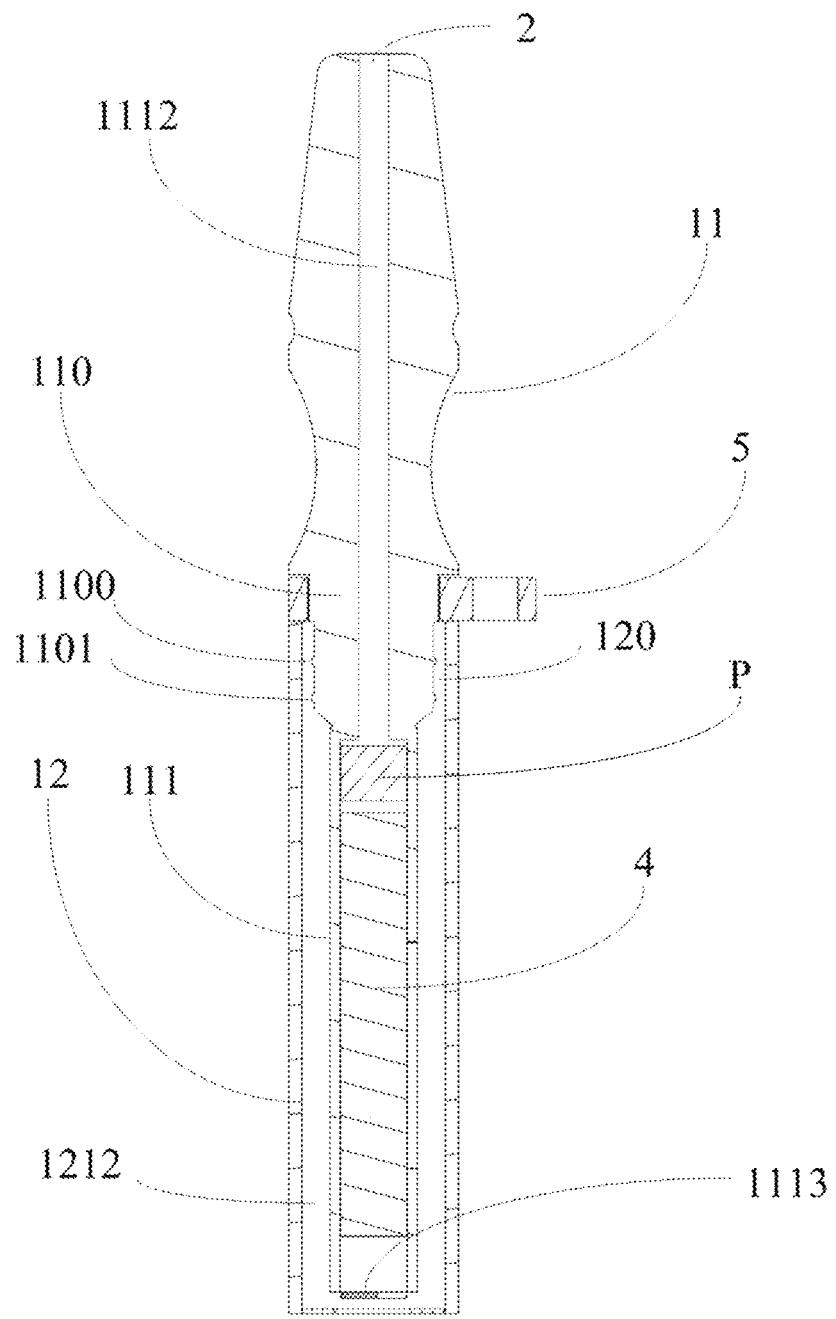
FIG. 3 is a cross-sectional view of the breathing adjustment apparatus of the present disclosure.

As shown in FIGS. 1-3, the breathing adjustment apparatus includes: a body with a breathing channel, which may be configured as a hollow tubular structure; a first opening 2, located at one end of the body and designed for insertion into the mouth of a user, which first opening 2 may also be positioned elsewhere on the body; a second opening 3, communicating with the first opening 2 and located at the other end of the body for exhalation, which second opening 3 may also be positioned elsewhere on the body; an inner core 4 housed inside the body, which provides a breathing resistance.

As shown in FIG. 2, the body of the breathing adjustment apparatus may consist of multiple parts, such as a first body 11 and a second body 12 detachably connected to the first body 11. The first body 11 can rotate clockwise or counterclockwise relative to the second body 12. In one embodiment, the first body 11 and second body 12 may be connected via threading. Alternatively, the first body 11 and second body 12 may be connected via a plug-in mechanism.

As shown in FIGS. 2-3, the first body 11 includes a first connecting portion 110, and a first accommodating cavity 111 extending toward the second opening 3 and accommodating the inner core 4. The first accommodating cavity 111 includes a third opening 1110. As shown in FIG. 1, the first body 11 also includes a tip 1111 designed for insertion into the user's mouth. The second body 12 is a cylindrical structure with a circular cross-section and a constant inner diameter. The length of the body ranges from 5 to 8 cm.

As shown in FIG. 2, air enters the body through the first opening 2 and reaches the second opening 3 through the inner core 4. The inner core 4 provides a breathing resistance inside the body. As shown in FIG. 3, the first body 11 includes a first breathing channel 1112, and the second body 12 includes a second breathing channel 1212. Together, the first and second breathing channels 1112, 1212 form the breathing channel. The third opening 1110 connects the first breathing channel 1112 and the second breathing channel 1212. The inner core 4 may contain an aromatherapy material to improve the user's breathing experience. It may primarily consist of cotton. Additionally, the diameter of the inner core 4 has a significant impact on the breathing resistance. The diameter of the inner core 4 may be equal to the inner diameter of the first accommodating cavity 111. In one embodiment, the diameter of the inner core 4 may be slightly larger than the inner diameter of the first accommodating cavity 111. In another embodiment, the difference between the diameter of the inner core 4 and the inner diameter of the first accommodating cavity 111 may range from −2 to 2 mm.

As shown in FIG. 3, the second body 12 includes a second connecting portion 120. The first connecting portion 110 engages with the second connecting portion 120, and is rotatable clockwise or counterclockwise relative to the latter. The first connecting portion 110 includes a first limiting structure 1100, and a second limiting structure 1101, which are provided to restrict the second body 12 to a first position or second position on the first body 11. For example, the user may adjust the position of the second body 12 by rotating, plugging or unplugging. The first and second limiting structures 1100, 1101 are located on the outer edge of the first connecting portion 110 and protrude outward. When the user adjusts the second body 12 to the first position by rotating, plugging or unplugging, the second connecting portion 120 engages with both the first limiting structure 1100 and the second limiting structure 1101. When the user adjusts the second body 12 to the second position by rotating, plugging or unplugging, the second connecting portion 120 only engages with the second limiting structure 1101. The first and second limiting structures 1100, 1101 may lock the second body 12 and restrict its movement.

As shown in FIG. 3, a gas-water separation filter pad P is provided in the first accommodating cavity 111 and provided between the first opening 2 and the inner core 4. The gas-water separation filter pad P can guarantee smooth breathing. Besides, when the breathing adjustment apparatus is used with the gas-water separation filter pad P, the essential oil in the inner core 4 will not enter the mouths of the users, and only the air will enter the mouths.

As shown in FIGS. 1-2, the breathing adjustment apparatus further includes a suspension unit 5, which is provided with a third connecting portion 50 coupled to the first connecting portion 110. When the first body 11 and second body 12 are connected, the suspension unit 5 is positioned between them. The suspension unit 5 may also be attached to jewelry, such as a necklace.

Figure 4:
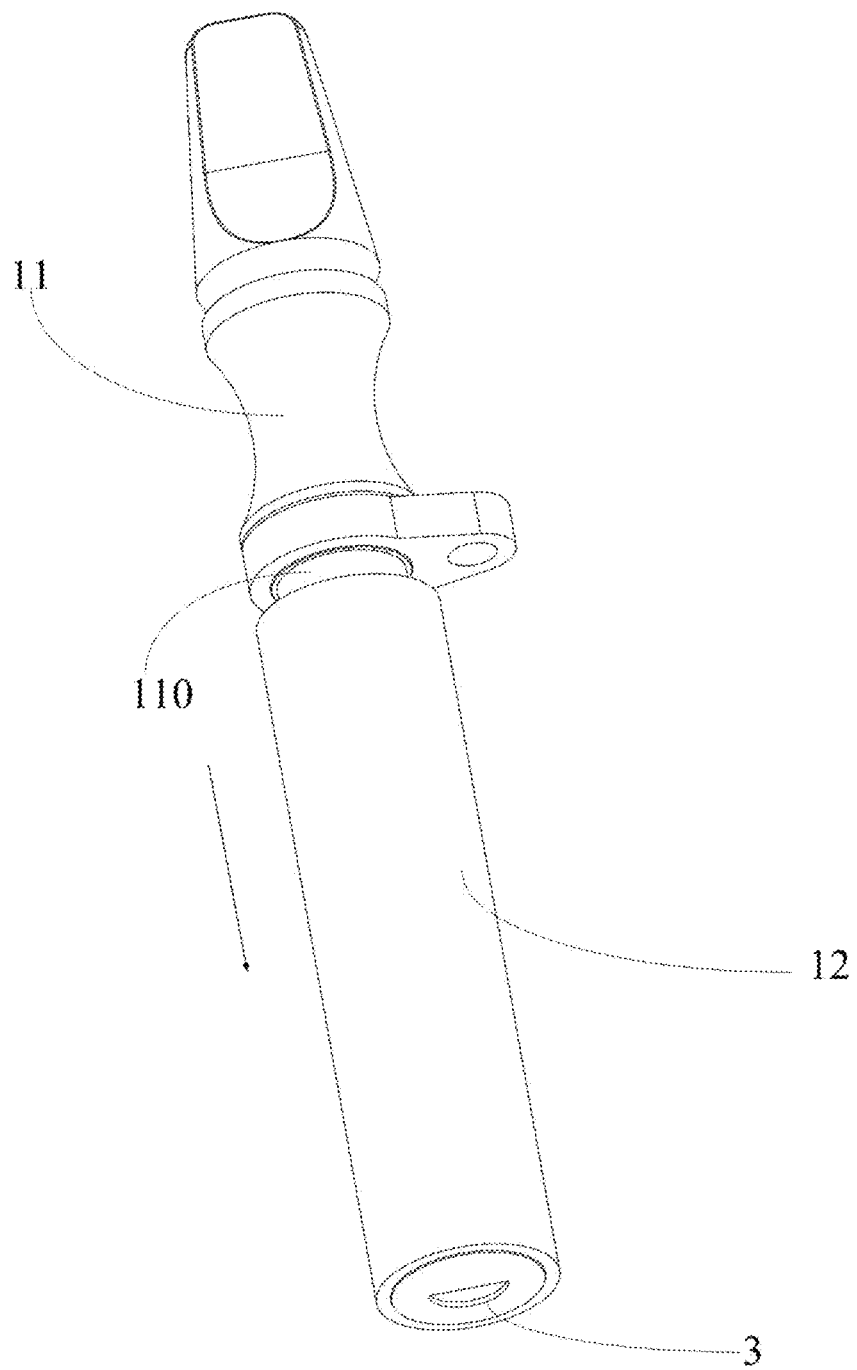
FIG. 4 illustrates a state of use of the breathing adjustment apparatus of the present disclosure.

As shown in FIGS. 2-3, a first boss 1113 is provided at one end of the first accommodating cavity 111 close to the second opening 3. For example, the first boss 1113 may be semicircular or triangular. The second opening 3 matches the first boss 1113 such that the first boss 1113 can be inserted into and block the second opening 3. As shown in FIG. 2, the second opening 3 is configured such that when the second body 12 is at the first position, the first boss 1113 is inserted into the second opening 3 and the first body 11 is not rotatable clockwise or counterclockwise with respect to the second body 12, causing the first and second breathing channels 1112, 1212 to be closed from the outside. As shown in FIG. 4, the second opening 3 is configured such that when the second body 12 is at the second position, the first boss 1113 is separated from the second opening 3 and the first body 11 is rotatable clockwise or counterclockwise with respect to the second body 12, causing the first and second breathing channels 1112, 1212 to be open to the outside.

When the first boss 1113 is separated from the second opening 3 and the first body 11 is rotatable clockwise or counterclockwise with respect to the second body 12, the user can misalign the first boss 1113 and the first opening 2 by rotating the second body 12. By misaligning the first boss 1113 and the first opening 2, the user can adjust the breathing resistance. For a larger breathing resistance, the user needs a smaller misalignment between the first boss 1113 and the first opening 2. For a smaller breathing resistance, the user then needs a larger misalignment between the first boss 1113 and the first opening 2.

The above are only preferred embodiments of the present disclosure, and are not intended to limit its scope. Any modifications, equivalent substitutions, or improvements made within the spirit and principles of the present disclosure shall fall within its protection scope.

What is claimed is:

1. A breathing adjustment apparatus, comprising:
   a body provided with a breathing channel, the body being of a hollow tubular structure;
   a first opening disposed at one end of the body and configured to be inserted into the mouth of a user;
   a second opening in communication with the first opening, wherein the second opening is disposed at the other end of the body and configured for exhalation; and
   an inner core housed within the body for providing a breathing resistance;
   wherein air enters the body through the first opening and reaches the second opening through the inner core,
   wherein the body comprises a first body and a second body connected to the first body, the first body being rotatable clockwise or counterclockwise relative to the second body, the first body comprises a first connecting portion, and a first accommodating cavity extending toward the second opening and configured to accommodate the inner core, the first accommodating cavity comprises a third opening,
   the second body comprises a second connecting portion, the first connecting portion being connected to the second connecting portion, and the first connecting portion being rotatable clockwise or counterclockwise relative to the second connecting portion,
   the first connecting portion comprises a first limiting structure and a second limiting structure, the first limiting structure and the second limiting structure being configured to restrict the second body to a first position and a second position on the first body,
   the first limiting structure and the second limiting structure are disposed on the outer edge of the first connecting portion and protrude outward, respectively,
   the first body comprises a first breathing channel, wherein the second body comprises a second breathing channel, and wherein the first breathing channel and the second breathing channel constitute the breathing channel,
   a first boss is disposed at an end of the first accommodating cavity in proximity to the second opening, the second opening matches the first boss in a manner that the first boss is inserted into and blocks the second opening, while the second body is at the first position, the first boss is inserted into the second opening, and the first body is not rotatable clockwise or counterclockwise relative to the second body in a manner that the first breathing channel and the second breathing channel are not in communication with the external environment; and
   while the second body is at the second position, the first boss is separated from the second opening, and the first body is rotatable clockwise or counterclockwise relative to the second body, in a manner that the first breathing channel and the second breathing channel are in communication with the external environment,
   while the first boss is separated from the second opening and the first body is rotatable clockwise or counterclockwise relative to the second body, the second body is rotated by the user in a manner that the first boss misaligns with the first opening, the first body comprises a tip configured to be inserted into the mouth of the user.

2. The breathing adjustment apparatus according to claim 1, further comprising a suspension unit, wherein the suspension unit is provided with a third connecting portion connected to the first connecting portion.

3. The breathing adjustment apparatus according to claim 1, wherein the inner core contains an aromatherapy material.

4. The breathing adjustment apparatus according to claim 1, wherein the inner core comprises cotton.

5. The breathing adjustment apparatus according to claim 4, wherein the diameter of the inner core differs from the inner diameter of the first accommodating cavity by −2 to 2 mm.

6. The breathing adjustment apparatus according to claim 1, wherein while the first body is connected to the second body, the suspension unit is located between the first body and the second body.

7. The breathing adjustment apparatus according to claim 1, wherein the second body is a cylindrical structure with a circular cross-section and a constant inner diameter.

8. The breathing adjustment apparatus according to claim 1, wherein a gas-water separation filter pad is provided in the first accommodating cavity and provided between the first opening and the inner core.

* * * * *